United States Patent [19]

Abma

[11] Patent Number: 4,584,932
[45] Date of Patent: Apr. 29, 1986

[54] APPARATUS FOR HEAT-TREATING A LIQUID PRODUCT

[75] Inventor: Freerk Abma, Ed Purmerend, Netherlands

[73] Assignee: Stork Amsterdam B.V., Amsterdam, Netherlands

[21] Appl. No.: 567,871

[22] Filed: Jan. 3, 1984

[30] Foreign Application Priority Data

Jan. 7, 1983 [NL] Netherlands ......................... 8300061

[51] Int. Cl.$^4$ .............................................. A23C 3/00
[52] U.S. Cl. ........................................ 99/455; 99/453; 99/470; 99/483
[58] Field of Search .......................... 99/452, 453–455, 99/467, 468, 470, 472, 477, 483, 516, 534; 426/397, 521, 522; 422/132, 135, 128, 200; 165/138, 184

[56] References Cited

U.S. PATENT DOCUMENTS 4,446,778 5/1984 Cipelletti ......................... 99/470 X
4,479,423 10/1984 Schwitters ........................... 99/455

FOREIGN PATENT DOCUMENTS 3119632 5/1981 Fed. Rep. of Germany ........ 99/470

Primary Examiner—Timothy F. Simone
Attorney, Agent, or Firm—J. Gibson Semmes

[57] ABSTRACT

Apparatus for heat-treating a liquid product comprising series-connected multi-tube heat-exchangers such as heating-up heat-exchangers (6, 12), a high temperature heat-exchanger (14) and cooling-down heat-exchangers (17, 18, 19), the heating-up heat-exchangers and cooling-down heat-exchangers being interconnected by means of a pipe system (25, 26); (34) for regenerative heat-exchange. The heat exchangers being connected by means of connection members (13) having separate passages which connect the tubes of the heat-exchanger to those of the next heat-exchanger. The pipe system for regenerative heat-exchange being designed so that the quantity of heat to be transferred can be adjusted in order to adapt said apparatus to varying capacities.

2 Claims, 6 Drawing Figures

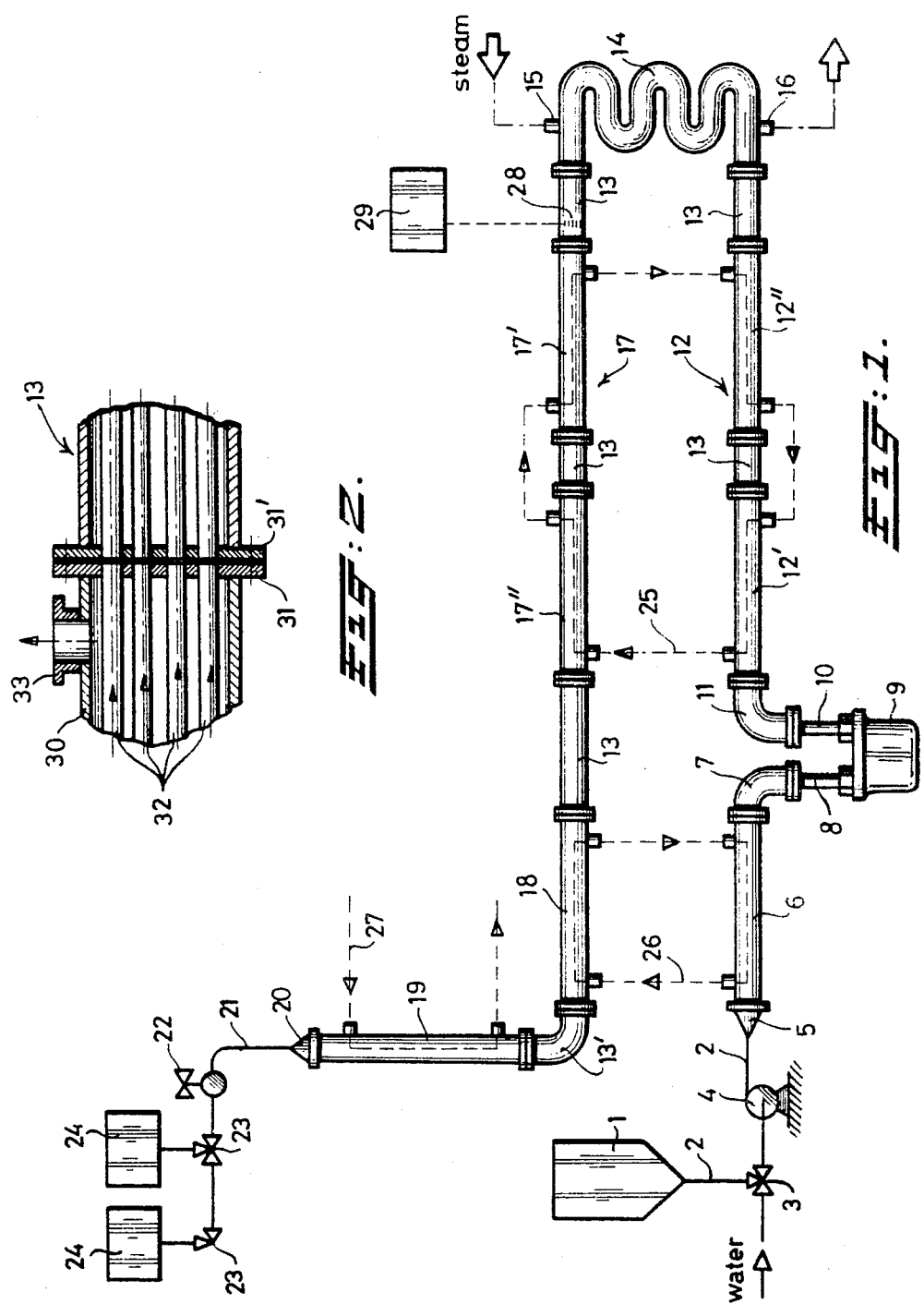

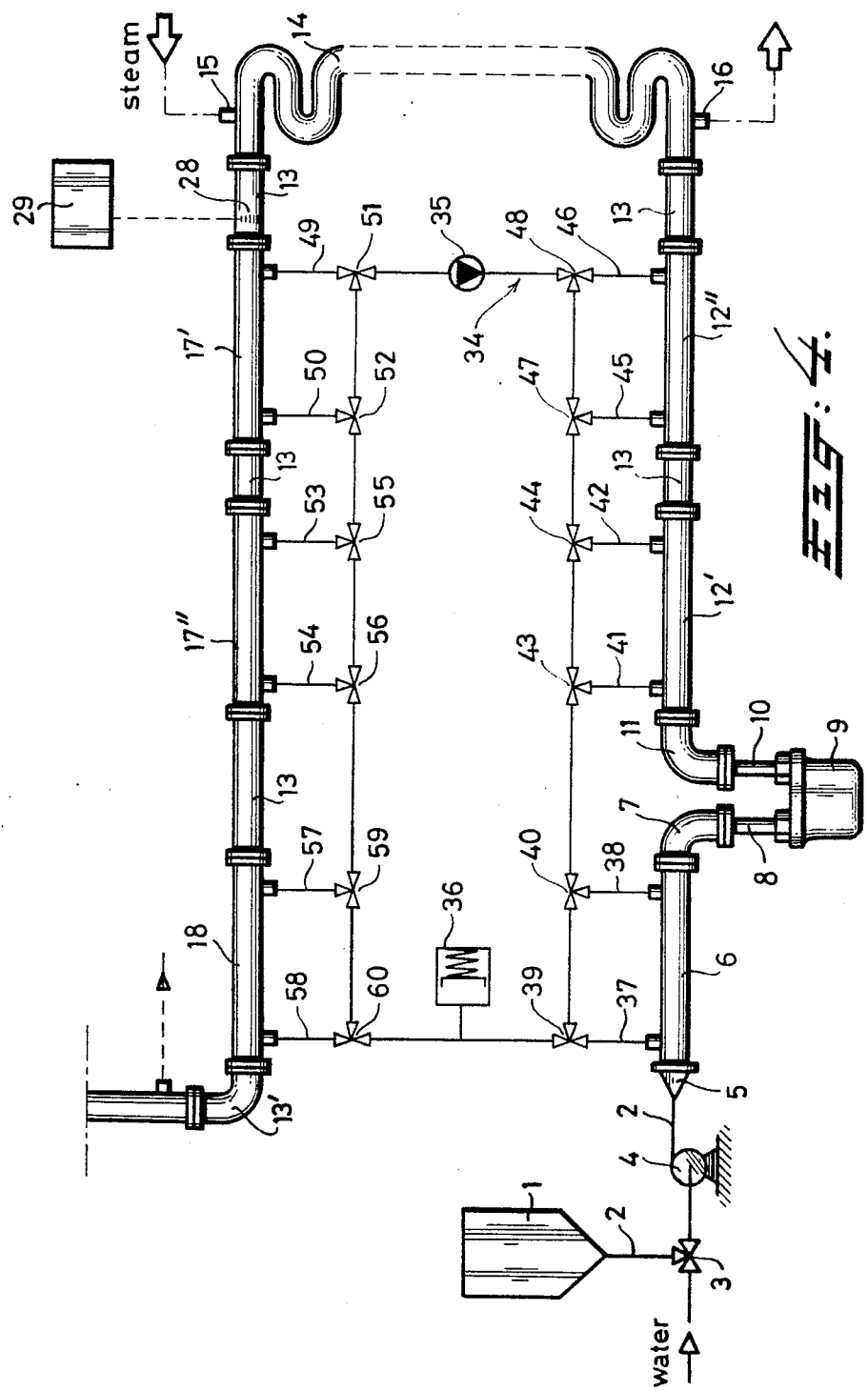

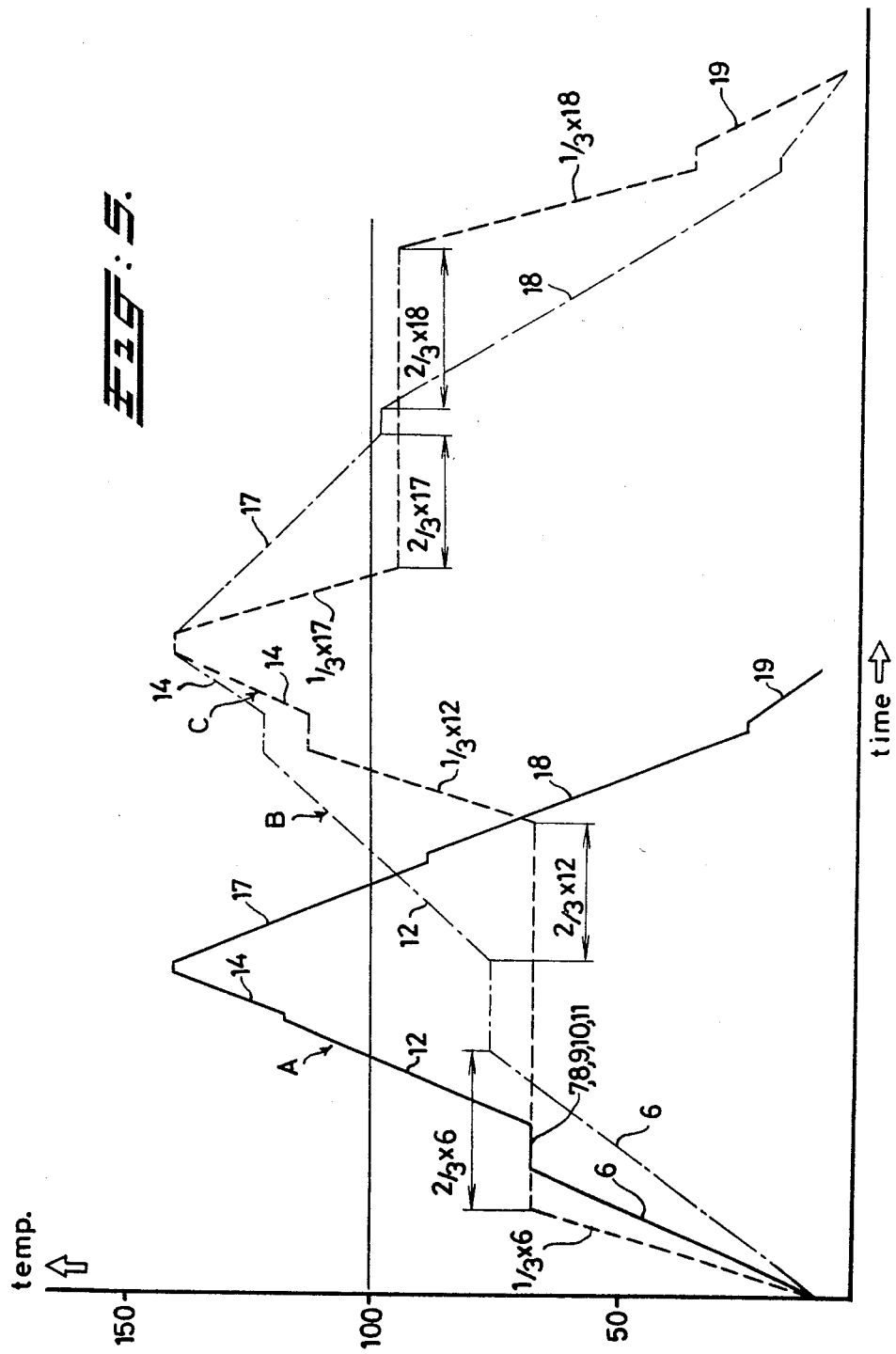

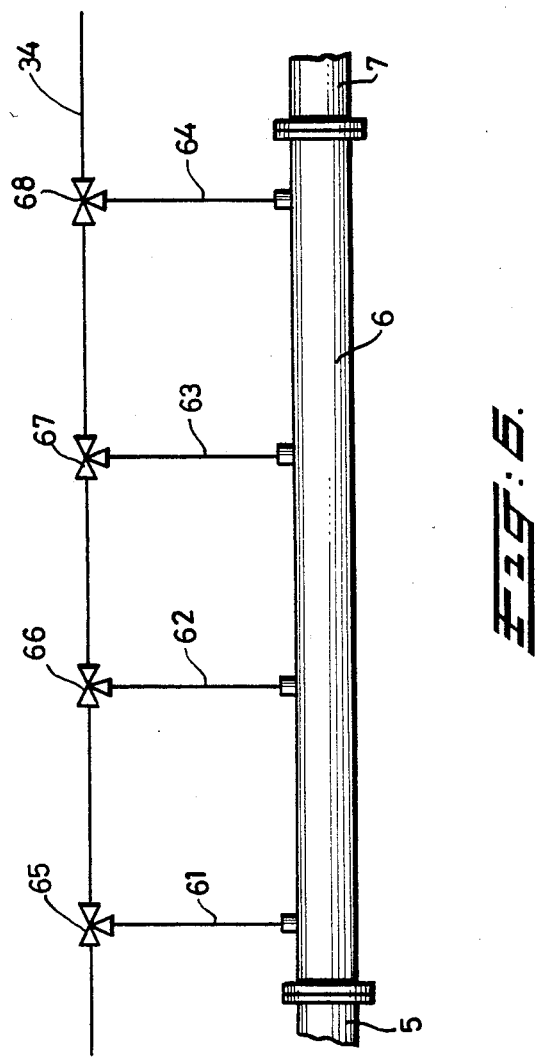

APPARATUS FOR HEAT-TREATING A LIQUID PRODUCT

BACKGROUND OF THE INVENTION

This invention relates to apparatus for heat-treating a liquid product, which product is temporarily subjected to a high temperature, comprising series-connected multi-tube heat exchangers, a heating-up heat exchanger, a high-temperature heat-exchanger and a cooling-down heat-exchanger, the heating-up and cooling-down heat-exchangers being interconnected by means of a pipe system for regenerative heat-exchange, the apparatus being connected to conduits for supplying and/or discharging heat and being provided with measuring, monitoring and control equipment.

Apparatus of this kind is frequently used for sterilizing fruit juices, milk products and milk. On the one hand, the product to be treated has to be kept at a high temperature for a certain time during the treatment, in order to ensure that contaminating organisms are rendered sufficiently inactive, while on the other hand the time during which the product is kept at high temperature must not be too long since otherwise undesirable changes in the quality and the taste of the product are caused. This applies particularly to milk and milk products. Good results are obtained by heating the product for a short time to the required high heating temperature and keeping it at that temperature for an accurately maintained short period, and then cooling it rapidly.

EP-A No. 0 036 124 discloses an apparatus of this kind. This apparatus is constructed from a large number of identical tube heat-exchanger sections which are assembled to form heat-exchangers in which the product is respectively preheated, heated and cooled. Each tube heat-exchanger section consists of a tubular housing accommodating a number of parallel tubes mounted in the housing by means of two end plates. The product to be treated flows from the common space in front of one end plate to the common space behind the other end plate via the tubes. A heating and coollling fluid respectively flows in the housing between the two end plates. This means that the product to be treated is divided into separate flows in each heat-exchanger section for takingup and yielding heat respectively and that these flows are combined again at the end of each heat-exchanger section, whereupon the product is fed via a connecting pipe to the next heat-exchanger section, where it is again divided and so on.

Consequently, the connecting pipes are always at the average temperature and it is impossible to check whether one or more tubes of a certain heat exchanger are fouled. When the apparatus is washed out with a cleaning agent it will also be impossible to tell whether the tubes with the most fouling have been fully cleaned. One of the results of this may be that blockages still present locally will prevent some of the cleaning liquid from being removed, so that this liquid may mix with the product during the subsequent heat-treatment. The remaining fouling also causes a reduction in the sterilizing efficiency of the apparatus and accelerated new fouling, so that the cleaning frequency has to be increased at the expense of heat-treatment operating time. There is also the risk that the product will be inadequately heated in some of the tubes so that not all the bacteria are destroyed, and this inadequately treated product may again be mixed with product which has been subjected to the correct treatment.

SUMMARY OF THE INVENTION

It is a main object of this invention to provide an apparatus in which these drawbacks are obviated. To this end, according to the invention, the tubes in each multi-tube heat-exchanger are constructed to extend continuously without interruption, connecting members being provided between the heat-exchangers at least in that part of the apparatus where there is a risk of fouling, said connecting members having a number of separate passages which connect the tubes of one heat-exchanger to those of the next heat-exchanger.

In this way, the product to be treated flows through the appartus via a number of separate channels and there is no mixing of the said product flows, at least in the area where the greatest fouling occurs. Preferably, each of the passages of at least the connecting member situated at the outlet of the heat-exchanger where the maximum temperature sensor connected to the monitoring and control equipment.

Fouling due to the caking of deposits or the like will occur primarily in the high-temperature heat-exchanger. By measuring the temperature of the product to be treated in each channel, it is possible to check accurately whether the product has experienced the correct heat treatment everywhere. It is also possible to tell from the temperature measurement which channel is intensely fouled and when the apparatus has to be shut down for cleaning.

In order to prevent that in case the apparatus is not working at is full capacity the product to be treated is subjected to the high temperature for a too long period, according to the invention the pipe system for regenerative heat-exchange is designed so that the heat to be transmitted can be adjusted as desired.

According to a preferred embodiment of the present invention the pipe system for regenerative heat-exchange consists of a parallel pipe circuit disposed outside both heat exchangers, each section of the heat exchangers being connected to the parallel pipe circuit by means of at least two conduits, via three-way valves.

By adjusting the three-way valves the intermediate fluid can be led through each section or passed outside each section. The number of sections which will take part in the regenerative heat-exchange process can be chosen as desired.

Each heat-exchange section can be connected to the parallel circuit by means of a plurality of spaced conduits. In this way also only a portion of said section can be used for regenerative heat-exchange.

The present invention also relates to a method of operating the apparatus according to the invention, due to which method the temperature ($T_n$) of the product to be treated is measured in each channel near the transition from the high-temperature heat-exchanger to the cooling-down heat-exchanger the average temperature ($T_g$) of these temperatures being determined, while the deviation of this average temperature from a required or set temperature ($T_i$) is a measurement for the supply of heat-carrying fluid to the high-temperature heat-exchanger, and the deviation of each separately measured temperature ($T_n$) from the set temperature ($T_i$) is determined, the apparatus being switched over to cleaning operation if this deviation exceeds certain tolerance limits.

The present invention also relates to a method of cleaning the apparatus according to the invention, in which cleaning agent is fed through the various channels, heat being supplied in the high-temperature heat-exchanger and the temperature ($T'_n$) in each channel being measured near the transition from the high-temperature heat-exchanger to the cooling heat-exchanger, while an average temperature ($T'_g$) is calculated therefrom, the supply of heat-carrying fluid to the high-temperature heat-exchanger being controlled as a function of the deviation of the average temperature ($T'_g$) from a required set temperature ($T'_i$), cleaning being continued until the deviation of each separately measured temperature ($T'_n$) from the set temperature ($T'_i$) is within certain tolerance limits.

SURVEY OF THE DRAWINGS

FIG. 1 is a schematic plan view of the apparatus according to the invention;

FIG. 2 is an enlarged-scale detail of the connection between two elements of the apparatus of FIG. 1;

FIG. 4 is a detail of the apparatus of FIG. 1 with a modified pipe system for regenerative heat-exchange;

FIG. 5 is a temperature-time graph of the product to be treated at a lower capacity of the apparatus; and FIG. 6 is a detail of the apparatus, showing a heat-exchange section with connections to the parallel circuit for regenerative heat-exchange.

DESCRIPTION OF THE PREFERRED EMBODIMENTS

Figure 3:
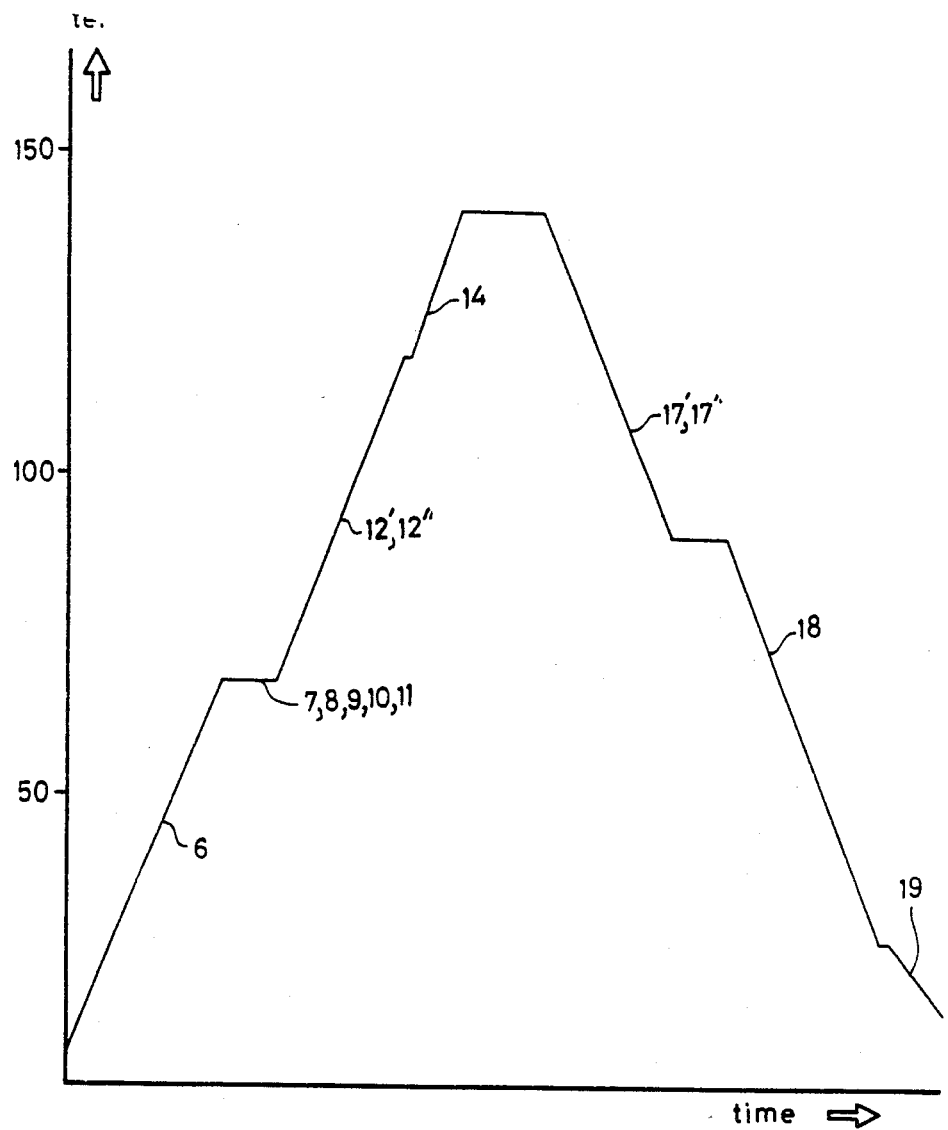
FIG. 3 is a temperature-time graph of the product to be treated in the apparatus of FIG. 1.

As shown schematically in FIG. 1, the product to be treated, e.g. milk, is fed from a reservoir 1 via a feed pipe 2 containing a three-way valve 3 connected to a water supply to enable water to be fed to the apparatus to prevent it from boiling dry in the event of any disturbance in the supply of product to be treated. The milk is fed by a pump 4 in pipe 2 to a pre-heating tube heat-exchanger 6 via an inlet connection 5. From the heat-exchanger 6 the milk is fed via a connection 7 and a pipe 8, to a homogenizer 9 and then under elevated pressure via a pipe 10 and a connector 11 to a number of interconnected heat-exchanger sections 12' and 12", which together form a heating-up heat exchanger 12 of the apparatus. A connecting member 13 comprising a number of parallel passages is provided between the heat-exchanger sections 12', 12" and connects the tubes of the heat-exchanger section 12' to those of the next heat-exchanger section 12" so as to form a continuous channel for the product to be treated. The milk coming from the heating-up heat-exchanger 12 is then fed via a connecting member 13 to a high temperature heat-exchanger 14 also provided with a number of parallel tubes, steam being supplied at the connection 15 and condensate discharged at the connection 16. From the high-temperature heat-exchanger 14 the milk is fed via a connecting member 13 to a tube heat-exchanger section 17' of a cooling-down heat-exchanger 17 of the apparatus, which in this case consists of two heat-exchanger sections 17' and 17". From this cooling-down heat-exchanger the milk flows via a connecting member 13 to the heat-exchanger 18 and then via a connecting member 13' to a final cooler 19. From cooler 19 the milk is fed via an outlet connection 20 to the pipe 21 containing a throttle valve 22, whereupon the milk is discharged via three-way valves 23 to one or more filling devices 24.

In the embodiment of the apparatus shown in FIG. 1, an intermediate fluid is always used for the heat transfer. For example, heat from the cooling-down heat-exchanger is transferred to the heating-up heat exchanger by means of an intermediate fluid flowing in counter-current through a closed circuit shown by broken line 25. A circuit 26 for an intermediate fluid is also shown between the heat-exchanger 18 and the pre-heating heat-exchanger 6. Finally, a cooling fluid 27, such as water, flows in counter-current through the cooler 19.

A temperature sensor 28 is disposed in each passage of the connecting member 13 situated between the high-temperature heating heat-exchanger and the cooling heat-exchanger 17, the temperature sensors 28 each being connected to a control and monitoring unit 29.

It will be apparent that there is no need for an intermediate fluid between the cooling heat-exchanger and the heating-up heat-exchanger and that the heat can be transferred directly from the treated product to the product, still requiring treatment. In that case, however, it is not possible to run the product through the heating-up and cooling-down heat-exchangers in continuous separate channels. This need not of itself be a drawback, since the present invention lies primarily in the idea of passing the product through separate channels only where the greatest fouling occurs and the greatest fouling will occur in the region of the high-temperature heat-exchanger.

In the embodiment illustrated, the product flows through the heating-up heat-exchanger 12, the high-temperature heat-exchanger 14, the cooling-down heat-exchanger 17, the heat-exchanger 18, and the cooler 19 in separate channels. To this end, the various heat-exchangers and/or heat-exchanger sections are interconnected by means of a connecting member 13 (shown on an enlarged scale in detail in FIG. 2).

The left-hand part of said FIG. 2 shows one end of a tube heat-exchanger as used in the apparatus according to the invention. This heat-exchanger consists of a tubular housing 30 closed at both ends by an end plate 31. The housing contains a number of parallel tubes 32 which lead out through the end plates. The tubular housing of the heat-exchanger also contains an inlet 33 and an outlet (not shown) for a cooling and heating fluid respectively. The end plate 31' of connecting member 13 is disposed directly against the end plate 31 of the heat-exchanger and is provided with a number of parallel passages which correspond, in respect of positions and dimensions, to those of the tubes of the heat-exchangers for connection thereto. The connecting members may be constructed so as to correspond completely to the heat-exchangers, i.e. having parallel tubes disposed in a housing and end plates, but without the connections for a cooling and heating fluid respectively. The space between the tubes can in that case be filled with insulating material if required, to form a zone where the product temperature remains constant.

In practice the heat-exchanger sections are spiral in shape and can have a length of appr. 20 to 80 meters.

FIG. 3 shows a diagram of the milk temperature as it passes through the sterilizing apparatus of FIG. 1. The numbers given on this graph correspond to the apparatus components (FIG. 1).

As already stated hereinbefore, the tubes will foul during operation and this fouling will be greatest where the higher temperatures occur. This fouling is coupled with a decrease in heat transfer. The temperature sensor disposed in each separate channel readily indicates when the fouling of one of the tubes becomes unacceptable. If this is the case, the apparatus is switched over to cleaning operation, cleaning agent being fed through the separate channels. This cleaning operation can also be carried out very efficiently by means of the apparatus according to the invention, because the temperature in the various channels can be measured during cleaning operation as well.

Cleaning is continued until the temperature deviations in the different channels are within certain tolerance limits. In this way there is absolute certainty that each channel has been cleaned completely after the cleaning operation. If hard-to-shift contamination occurs in one or more channels, then the apparatus must of course be opened. A considerable advantage in that case is that the channel or channels requiring further treatment is/are accurately known.

FIG. 4 shows a detail of a modified embodiment of the apparatus according to the invention in which the pipe system for regenerative heat-exchange has been designed so as to adjust the heat to be transmitted. If, for example the apparatus does not work at its full capacity, there is less product to be treated flowing through the tubes of the heat-exchangers or heat-exchanger sections. In this case the product will be subjected to the high temperature for a too long period which affects the quality and the good taste of said product. At a lower capacity the velocity of the product in the tubes is lower and consequently the transmitted heat per time unit is higher.

In FIG. 5 the solid line "A" shows a temperature-time graph of the product when the apparatus is working on its full capacity. The line "B" shows the temperature-time graph of the product in case the apparatus is working at half its capacity. It will be apparent that in this case the product will have a temperature over 100° C. for a much longer period than in the first case.

In this connection it is to be noticed that the highest temperature, which will be reached in the high-temperature heat-exchanger 14 is the same in both cases. The high-temperature heat-exchanger 14 is of the type disclosed in EP-A No. 0 081 256 of Applicant and will automatically adapt to varying circumstances.

The line "C" in FIG. 5 shows a temperature-time graph of the product when the apparatus is working at half its capacity and a portion of the heat-exchangers 6, 12, 17 and 18 has been rendered inoperative. In this case the period during which the product temperature exceeds 100° C. is substantially equal as in case of line "A".

The embodiment of FIG. 4 offers the possibility to adjust the regenerative heat transfer by rendering some portions or sections of the heat-exchangers 6, 12, 17 and 18 inoperative. In stead of the circuits 25 and 26 the apparatus of FIG. 4 has a closed parallel pipe circuit 34 in which circuit a pump 35 and a pressure accumulator 36 of a known type has been arranged. Each heat-exchanger or heat-exchanger section is connected to the parallel circuit 34 by means of at least two conduits each conduit being connected via a three-way valve. So heat-exchanger 6 is connected to the parallel circuit 34 by means of conduits 37, 38 and three-way valves 39, 40; heat-exchanger section 12' by means of conduits 41, 42 and three-way valves 43, 44; heat-exchanger section 12" by means of conduits 45, 46 and three-way valves 47, 48; heat-exchanger section 17' by means of conduits 49, 50 and three-way valves 51, 52; heat-exchanger section 17" by means of conduits 53, 54 and three-way valves 55, 56; and heat-exchanger 18 by means of conduits 57, 58 and three-way valves 59, 60.

By operating the respective three-way valves the intermediate fluid can be led through a heat-exchanger or heat-exchanger section or in case less heat has to be transmitted, can be led outside the heat-exchanger through the parallel circuit 34. In this way it is possible to shut off each heat-exchanger or heat-exchanger section for regenerative heat transfer and the quantity of heat to be transmitted for regenerative heat-exchange can be adjusted as desired.

FIG. 6 shows a detail of a modified embodiment of the apparatus according to FIG. 4. In this embodiment each heat-exchanger or heat-exchanger section (for example heat-exchanger 6) is connected to the parallel circuit 34 by means of four conduits 61, 62, 63 and 64 via three-way valves 65,66,67,68. This embodiment is particularly suitable in case only a portion of a heat-exchanger section has to be rendered inoperative. In the example shown in FIG. 6 it is possible to render ⅓ or ⅔ of the length of the section inoperative. The line "C" in FIG. 5 illustrates the temperature-time graph of the product treated in an apparatus which has the possibility as shown in FIG. 6. In case of line "C" only the first ⅓ portion of heat-exchanger 6 is operative and the last ⅔ portion is inoperative. In this inoperative portion there is no heat transfer and this part of line "C" extends horizontally. Also the first ⅔ portion of heat-exchanger 12 is inoperative and only the last ⅓ portion of heat-exchanger 12 is operative by taking up heat from the first ⅓ portion of heat-exchanger 17, whereas the last ⅔ portion of heat-exchanger 17 is also inoperative, as well as the first ⅔ portion of heat-exchanger 18. Finally the last ⅓ portion of heat-exchanger 18 transfers its heat to the first portion of heat-exchanger 6.

It will be apparent that within the scope of the invention there are many possibilities for adjusting the regenerative heat transfer from the cooling-down part to the heating-up part of the apparatus.

The construction of the pipe system for regenerative heat-exchange according to FIGS. 4 and 6 offers the possibility to adapt the apparatus for changing capacities and making the apparatus usable under all circumstances, for instance when one of the filling devices 24 is falling out and the apparatus has to work on half its capacity.

What is claimed is:

1. Apparatus for the on-line heat-treating of a flowing liquid product wherein regenerative heat exchange is utilized and the product is briefly subjected to a high temperature comprising:
   (A) a pre-heating multi-tube product temperature elevating heat-exchanger;
   (B) at least one intermediate product temperature elevating multi-tube heat-exchanger, a product inlet of said heat-exchanger interconnected in series downstream from a product outlet of the pre-heating heat-exchanger (A);
   (C) a high temperature multi-tube product temperature elevating heat-exchanger, a product inlet of said heat-exchanger interconnected in series downstream from a product outlet of the intermediate heat-exchanger (B); said high temperature heat exchanger being subject to an external heat supply;
   (D) at least one product cooling multi-tube heat-exchanger, a product inlet of said heat-exchanger interconnected in series downstream from a product outlet of the high temperature heat exchanger (C);

(E) a complemental product cooling multi-tube heat-exchanger, a product inlet of said heat-exchanger, interconnected in series downstream from a product outlet of the cooling heat-exchanger (D);

(F) wherein heat exchangers (A), (B), (C), (D) and (E) are constructed with a flange attached at each product inlet and outlet; said flanges in combination with an exterior surface of the heat-exchanger defining a heat transfer space surrounding the tubes;

(G) a heat conduit flowpipe system for regenerative heat exchange containing an intermediate fluid with controllable flow to adjust quantity of heat transferred; said system interconnecting the heat transfer spaces of heat exchangers (A), (B), (D) and (E) with flowpipes such that the heat transfer space of heat exchanger (A) is interconnected with the heat transfer spaces of heat exchangers (B) and (E), the heat transfer space of heat exchanger (B) is interconnected with the heat transfer space of heat exchanger (D) and the heat transfer space of heat exchanger (D) is interconnected with the heat transfer space of heat exchanger (E);

(H) multi-tube connectors each being disposed in series between two adjacent heat-exchangers for interconnecting the tubes within both heat-exchangers so that continuous extending parallel channels for the product are formed; said connectors also having an attached flange at each product inlet and outlet in the same manner as the heat-exchangers with the interior space surrounding the tubes defined by the connector flanges and exterior surface of the connector utilized to contain a heat insulating material;

(I) at least one temperature sensor, the sensor having plural contact with the respective tubes of at least that connector which is interposed between the high temperature heat-exchanger (C) and the cooling heat-exchanger (D) whereby to interact with product measuring monitoring and control means therefor.

2. Apparatus for the on-line heat-treating of a flowing liquid product wherein regenerative heat exchange is utilized and the product is briefly subjected to a high temperature while the apparatus is operating at less than full capacity comprising:

(A) a pre-heating multi-tube product temperature elevating heat-exchanger;

(B) at least one intermediate product temperature elevating multi-tube heat-exchanger, a product inlet of said heat-exchanger interconnected in series downstream from a product outlet of the pre-heating heat-exchanger (A);

(C) a high temperature multi-tube product temperature elevating heat-exchanger, a product inlet of said heat-exchanger interconnected in series downstream from a product outlet of the intermediate heat-exchanger (B); said high temperature heat exchanger being subject to an external heat supply;

(D) at least one product cooling multi-tube heat-exchanger, a product inlet of said heat-exchanger interconnected in series downstream from a product outlet of the high temperature heat exchanger (C);

(E) a complemental product cooling multi-tube heat-exchanger, a product inlet of said heat-exchanger, interconnected in series downstream from a product outlet of the cooling heat-exchanger (D);

(F) wherein heat exchangers (A), (B), (C), (D) and (E) constructed with a flange attached at each product inlet and outlet; said flanges in combination with an exterior surface of the heat-exchanger defining a heat transfer space surrounding the tubes;

(G) a parallel heat conduit flowpipe circuit for regenerative heat exchange, the circuit arranged with a pump and a pressure accumulator interposed; heat-exchangers (A), (B), (D) and (E) each being connected to said circuit by means of at least two connecting flowpipes, each flowpipe being connected to the circuit via a three-way valve; said valves capable of totally or partially cutting out aforesaid heat-exchangers from the heat conduit circuit thereby in combination with the pump and pressure accumulator permitting continuous and discrete heat distribution regulation among the heat-exchangers (A), (B), (D) and (E);

(H) multi-tube connectors each being disposed in series between two adjacent heat-exchangers for interconnecting the tubes within both heat-exchangers so that continuous extending parallel channels for the product are formed; said connectors also having an attached flange at each product inlet and outlet in the same manner as the heat-exchangers with the interior space surrounding the tubes defined by the connector flanges and exterior surface of the connector utilized to contain a heat insulating material;

(I) at least one temperature sensor, the sensor having plural contact with the respective tubes of at least that connector which is interposed between the high temperature heat-exchanger (C) and the cooling heat-exchanger (D) whereby to interact with product measuring monitoring and control means therefor.

* * * * *